United States Patent [19]

Roos et al.

[11] 4,309,287
[45] Jan. 5, 1982

[54] REVERSE-OSMOSIS TUBULAR MEMBRANE

[75] Inventors: Martin Roos, Burlington; William Eykamp, Arlington; William W. Cooper, IV, Sudbury, all of Mass.

[73] Assignee: Abcor, Inc., Wilmington, Mass.

[21] Appl. No.: 145,829

[22] Filed: May 1, 1980

[51] Int. Cl.³ ............................................. B01D 31/00
[52] U.S. Cl. ................................. 210/247; 210/252; 210/321 T; 210/335; 210/433.2; 215/321.1
[58] Field of Search ............... 210/636, 637, 644, 652, 210/653, 654, 655, 247, 249, 257.2, 323 T, 321.1, 321.2, 321.3, 321.4, 321.5, 433.2, 445, 450, 541, 252, 335, 323.2

[56] References Cited

U.S. PATENT DOCUMENTS

| 3,480,147 | 11/1969 | Kanyok | 210/321.1 |
| 3,581,900 | 6/1971 | Clark | 210/321.1 |
| 3,708,069 | 1/1973 | Clark | 210/433.2 X |
| 3,710,946 | 1/1973 | Sawyer | 210/321.1 |
| 3,774,771 | 11/1973 | Manjikian et al. | 210/321.1 |
| 3,817,387 | 6/1974 | Bachle et al. | 210/321.1 |
| 3,819,513 | 6/1974 | Ishii et al. | 210/636 |
| 3,853,756 | 12/1974 | Stana | 210/636 |

OTHER PUBLICATIONS

Kremen, S. S., "Technology and Eng. of Roga Spiral-Wound R.O. Memb. Modules", in R.O. and Synthetic Membranes, S. Sourirajan Editor 1977.

Primary Examiner—Charles N. Hart
Assistant Examiner—David R. Sadowski
Attorney, Agent, or Firm—Richard P. Crowley

[57] ABSTRACT

A membrane module which includes a unitary, curved, backing support which retains all the U bends, serially connecting the membrane tubes, in a sealing relationship, and which includes an annular permeate-collector ring system at the end of each membrane tube and channels with a permeate manifold passageway, to provide efficient removal and easy cleaning of the permeate flow path.

18 Claims, 7 Drawing Figures

REVERSE-OSMOSIS TUBULAR MEMBRANE

BACKGROUND OF THE INVENTION

Typically reverse-osmosis membrane apparatuses comprise a plurality of tubular membranes positioned within a tubular, outer, pressure vessel adapted to withstand the higher pressures associated with reverse-osmosis processes, for example, over 500 psi, and typically up to 800 to 1200 psi or higher. The tubular membranes, often precast, but which also may be cast or formed in situ, are placed on a support or backing material within the outer tubes. In one technique, a precast, cellulose-acetate-type tubular membrane is placed within a porous carrier sheet and is pulled through the outer tube to its position within the outer tube. The tubular membrane may be separated from the outer tube by a permeable liner. The membrane then may be inserted either in a porous tube or in a nonporous tube, with a plurality of generally uniformly spaced holes therein.

In practice, groups of such outer tubes with tubular membranes; for example, up to about 1 inch in diameter, are placed in membrane modules, wherein a series of generally parallel arranged tubes; for example, 8 to 30, are positioned in a module support, and the ends of the tubes are connected by U-bend tubes, to provide for a serial connection of the tubes in the module. Due to the high pressure involved, the outer tubes and U bends are of metal, and the U bends may be cast inside another end element, and each U-bend flange is then bolted securely to the respective end of the membrane outer tube with appropriate rubber fittings to ensure a leak-free operation. Such modules of membrane tubes also may be used with some modification in connection with lower-pressure membrane operations, such as ultrafiltration processes.

In operation, a feed stream, such as a saline or brackish-water stream, or an aqueous stream containing low-molecular-weight salts, such as from a whey process, is introduced into the feed inlet of the module and into the inside of the membrane tube. The concentrated feed stream from the reverse-osmosis process is removed from the feed outlet of the module and is recovered or sent to the feed inlet of the next module for further process or treatment. The permeate stream passes through the tube, which may be porous or nonporous with holes therein, and drops into a shroud or into a cabinet from which the permeate is collected. In certain cases, the membrane is coated on a porous rod, and the permeate stream passes into the porous rod and to a collection device at one end of the rod.

It is desirable to permit ready access to the individual membrane tubes at one or both ends for periodic maintenance or replacement of the membrane tubes or associated components. In addition, it is also important to withdraw permeate efficiently and rapidly from each tube and to provide means to flush, such as by through-flushing, the permeate channel in the tube for cleaning purposes and to introduce and withdraw detergent cleaning solutions and biocide solutions. This is particularly useful in the treatment of process streams containing or derived from biodegradable material, such as whey process streams. Thus, it is desirable to provide for an easy and simple method and apparatus which provide for effective and rapid cleaning of the permeate channel.

SUMMARY OF THE INVENTION

Our invention relates to a membrane module, a method of manufacturing the module and the use of the module in a membrane process. In particular, our invention concerns an improved reverse-osmosis membrane module which provides for an easy, rapid and simple means to clean the outer permeate channel about the membrane tube.

Our invention comprises an improved membrane module which, in one embodiment, provides for a simple and economical means to retain a plurality of the U-bend elements, connecting the membrane tubes in a serial fluid-flow-path arrangement, securely in place and in a fitted sealing relationship with the one and the other ends of the membrane tube. The means to retain comprises a unitary backing element, preferably a curved, segmented portion, to fit about the exterior wall surface of all or substantially all of the U-bend elements at each end of the membrane module. Typically the unitary, curved, backing element is a 120° segment and is threadably or otherwise secured to the tube sheet plate at each end of the module, so as to permit the backing means to force the ends of the U-bend elements into the ends of the membrane tube. The backing permits easy removal of the backing element and the U-bend elements for inspection or maintenance purposes or for replacement of individual membrane tubes. This means to retain the U-bend elements avoids the difficulties and problems associated with cast U-bend manifolds and the bolting of each individual U-bend flange to the tube sheet.

In another embodiment of our invention, there is provided an efficient and simple permeate-collection system, whereby permeate, which forms in the space between the outer tube and the inner membrane tube, is permitted to flow freely and axially to one or both ends of the membrane tube through an axial permeate flow channel. Permeate is collected in an annular permeate collector at one or each end of the membrane tube and then is distributed from the collector ring through one or a plurality of permeate channel passageways in the tube sheet to the permeate manifold passageway between or on either side of the membrane tubes and, hence, to the permeate outlet of the module. Rather than employing support tubes and spacer elements, which inhibit efficient flow of the permeate in the axial channel, our invention also provides for the use of a defined-thickness, porous, highly open-mesh type of material in the permeate channel and surrounding and placed against the backing of the membrane tube.

Our invention also provides for an improved membrane module which includes the replacement backing means to retain the U-bend elements in combination with the improved permeate-flow-collection system.

Our invention will be described for the purpose of illustration only in connection with a particular and preferred membrane module; however, it is recognized that other persons skilled in the art may make various changes and modifications in the illustrated module, with such changes and modifications being within the spirit and scope of our invention.

DESCRIPTION OF THE EMBODIMENTS

Figure 7:
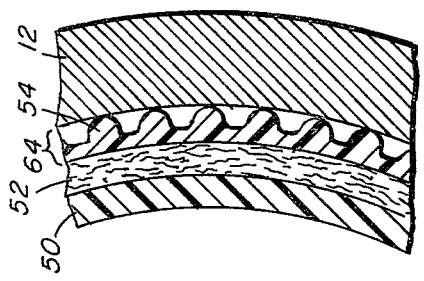
FIG. 7 is an enlarged, fragmentary and cross-sectional view along lines 7—7.
Figure 2:
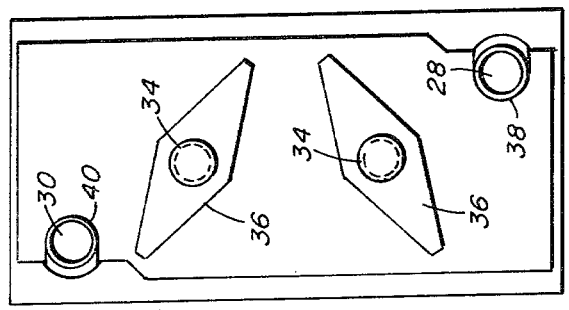
FIG. 2 is an end elevation view of one end of the module of FIG. 1.
Figure 4:
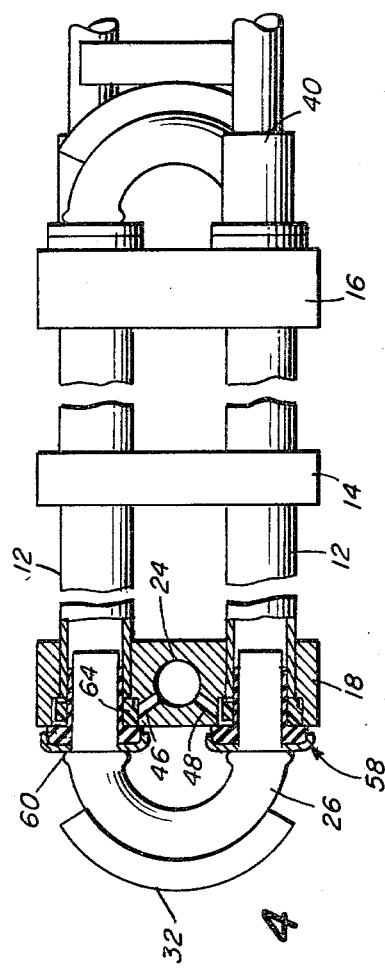
FIG. 4 is a top elevational view of the membrane module of FIG. 1, with one end view partially cut away.
Figure 1:
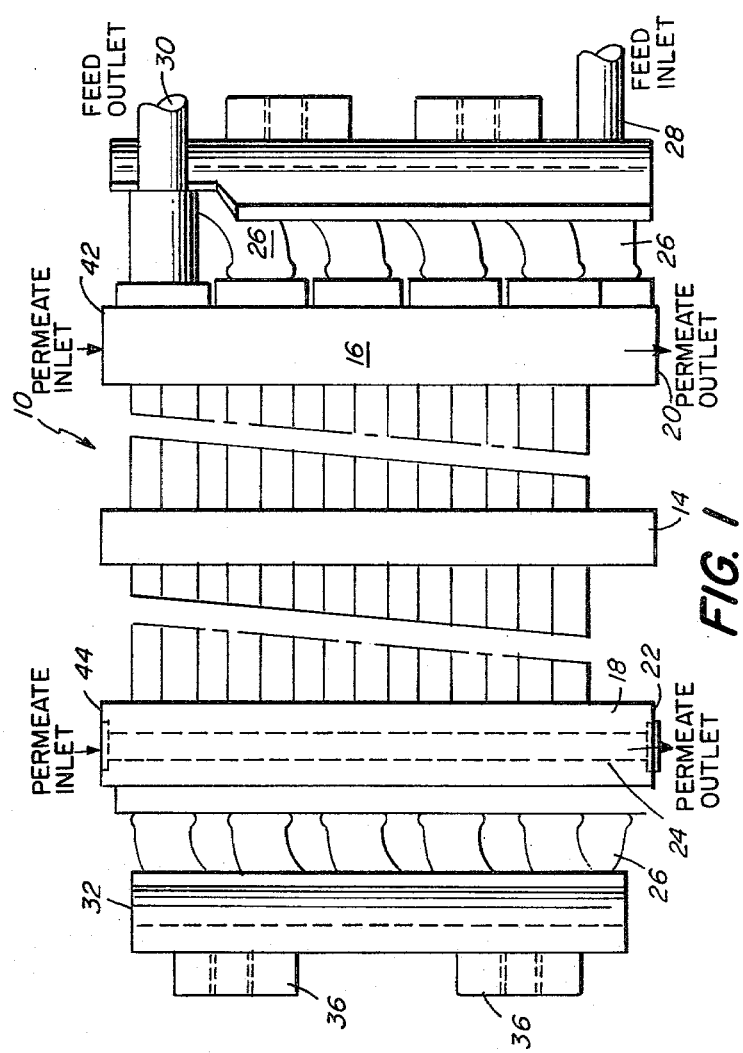
FIG. 1 is a side elevation view of a membrane module of our invention.
Figure 3:
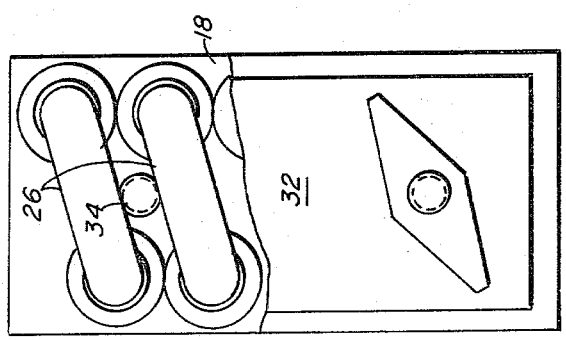
FIG. 3 is the opposite end elevational view of the other end of the module of FIG. 1 partially cut away to show the U-bend elements.
Figure 5:
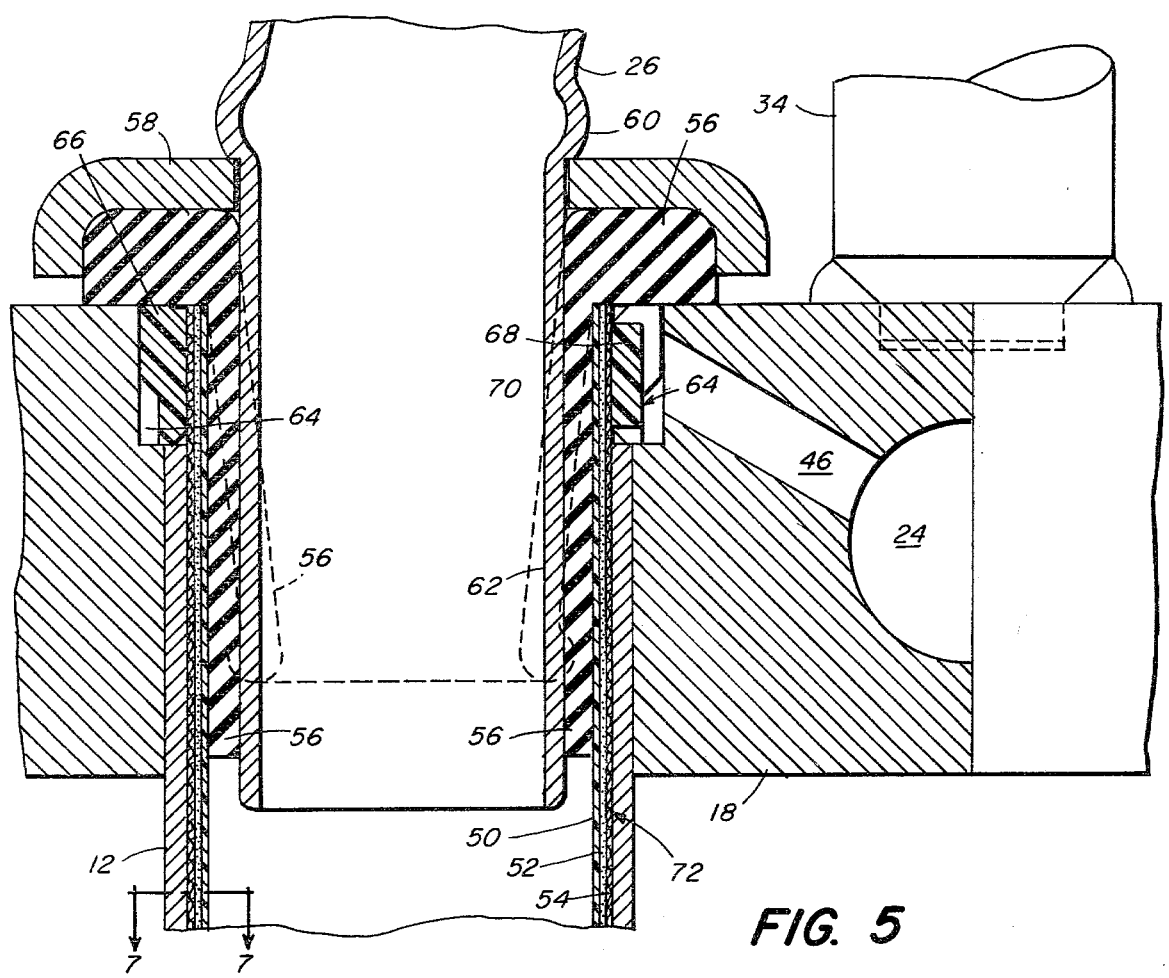
FIG. 5 is an enlarged, fragmentary and sectional view of FIG. 4.
Figure 6:
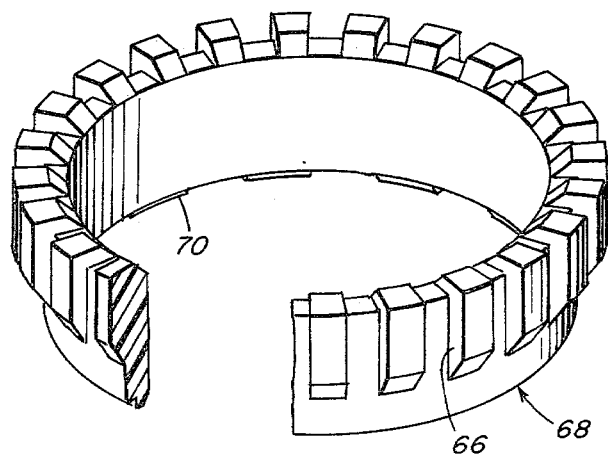
FIG. 6 is a partial sectional view and perspective view of an annular insert.

A membrane module 10 comprises a plurality of generally parallel, metal, outer, pressure-containing tubes 12 arranged and supported by support 14, with each end of the tubes positioned in tube sheets 16 and 18, each having a permeate inlet 42, 44 and a permeate outlet 20, 22, with a permeate manifold passageway through the tube sheet at 24 shown in the tube sheet 18 (and not shown in tube sheet 16). There is a plurality of 180° U-bend elements 26 providing a sealed, fluid-flow, serial communication between the membrane tubes 50 in each tube 12. A feed inlet 28 and a feed outlet 30 provide for introduction of a feed stream to be treated into the module and for a concentrated feed stream to be withdrawn, with the permeate removed from outlets 20 and 22 at each end of the membrane tubes. The module as illustrated has permeate inlets which are adapted to be connected to another membrane module, since typically the modules are employed in series and are interconnected as desired, to provide sufficient membrane surface for the process treatment and conditions as selected. The feed inlet may receive a feed stream from the feed outlet of another upstream module, while the feed outlet may be connected with the feed inlet of a downstream module as desired.

The membrane tube 50 may be precast and positioned in the outer tube with a porous paper or other carrier sheet, preferably tubular in form, and, optionally, one or more porous support or backing members may be used. The membrane tube 50 and carrier 52 are spaced apart from the interior wall of tube 12 by a highly porous, open-mesh, textile material 54; for example, a material known as tricot, to form an axial, annular, permeate flow path about the membrane 50 and carrier 52. The mesh material 54 is selected to permit flow of the permeate without a high pressure drop.

Each end of the U-bend elements 26 has an expander section 62 which is slidably fitted into grommet 56 in a close sealing relationship. This arrangement permits the inserted end of the U bend 26 to be removed without disturbing the membrane 50. The tube sheets 16 and 18 have a plurality of circular passageways therein to secure the ends of the tubes 12, with the end surfaces beveled or machined out to form an annular permeate-collector ring or cavity 64. A T-shaped elastomeric grommet or bushing 56 is used and fits within the interior of the membrane 50 at each end, to form a sealing relationship with the interior wall of the membrane 50 and expander section 62. A cup washer 58 on the T-shaped head of the bushing 56 is engaged by an enlarged retaining ring 60 or by dimples in the outer surface of the U bend 26, so that, on axial inward force of the U bend 26, the cup washer is forced inwardly to form a sealing relationship between the bushing 56 and the external wall surface of the tube sheet 18.

The elastomeric T bushing 56 is shown in dotted lines as initially installed and is shown in cross-hatched lines in use, when forced radially outwardly by the insertion of the expander section 62, which also extends the length of the bushing inwardly, but not beyond the end of the expander section 62.

Radial permeate channel passageways 46 and 48 extend and provide permeate flow communication between the annular cavity 64 formed at and about the end of the membrane tube 12 and the manifold passageway 24, which serves to collect the permeate flow from the permeate passageways 46 and 48. As shown, an annular plastic insert 68, containing raised ridges 66 thereon, is positioned in the end cavity 64. The insert 68 is an optional feature to reduce the volume of the permeate-collector cavity 64. The lower edge of the insert is serrated 70, to prevent any restriction in permeate flow into the permeate passageways 46 and 48.

The carrier sheet material 52 comprises a porous sheet material which serves as a slidable carrier sheet enfolding the preformed tube membrane; for example, peripherally surrounding the membrane tube 50 with a slight overlap along the length of the material. For example, the carrier material may comprise a thin, paper-like, strong, nonwoven, synthetic, fiber sheet material; for example, of a polyester fiber of a thickness of 0.002 to 0.006 inches, with about a 1/16-to-¼-inch overlap. This carrier sheet material is pulled through the outer tube 12 to position the membrane without tearing it.

The material 54, employed as the mesh material in the peripheral permeate flow channel 72, provides for a unique flow pattern of the permeate in the permeate channel. The material 54 comprises an open-mesh-like, woven material, with the flow channels of the material arranged in the axial direction about the membrane 50 and carrier sheets 52. The woven tricot material has hills and valleys chosen to promote flow in the axial direction; that is, toward the permeate ring cavity 64. For example, the tricot material may comprise a woven synthetic material; for example, of polyester or other fibers, with the fibers resin-impregnated; for example, with a melamine or other thermosetting resin, to provide some rigidity and stiffness to the woven material. The material 54 is placed within the tube 12 earlier or may be inserted with the carrier sheets 52 and tube 50. The flat material 54 is cut, so that the edges abut one another.

The porous, open-mesh material 54 typically is woven and composed of synthetic fibers and has a weave pattern of hills and valleys, to promote axial flow of the permeate in the permeate flow channel toward the ends and to the permeate-collector, ring, annular cavity 64. The material 54 is composed of a grooved or corduroy-like surface on one side, with the grooves running generally parallel and axially to form a series of permeate flow passageways in the cavity 64. The annular cavity 64 may vary in thickness; for example, 5 to 50 mils, and is substantially occupied by the grooved tricot material 54, with the grooved side of the material against the interior wall surface of the stainless-steel outer tube 12, and the other generally flat side disposed against the porous carrier material 52. For example, where the annular cavity 64 is about 12 mils, the tricot material (Southern Silk Mills Style 213) has a height of about 12 mils, with a thickness of 5 mils, to form parallel valleys of a thickness of about 7 mils, with the valleys having a width of about 15 mils and uniformly spaced about 15 mils apart.

FIG. 7 is an enlarged, sectional and schematic view of the arrangement of the tube 12, the material 54, the porous carrier material 52 and the membrane 50.

The sheet material 54 is sufficiently open in weave and mesh, to permit the permeate channel to be cleaned easily by through-flushing with a cleaning solution. The material 54 selected should be capable of withstanding the cleaning and biocidal solution used.

In operation, the permeate stream from along the axial length of each membrane tube 50 is formed in the axial permeate channel 72 and flows through the open-mesh material 54 toward either or preferably, as illustrated, both ends of the membrane tube and into the collector ring cavity 64, where the permeate then passes through permeate channels 46 and 48 to the permeate manifold passageway 24. This construction is particularly advantageous in that free and efficient flow of the permeate is permitted, while cleaning of the permeate passageways and channels in an easy and a simplified manner is readily accomplished by passing a cleaning solution or a biocidal solution or other treatment liquid through the same flow path. The annular permeate channel 72 of the module may be cleaned periodically by through-flushing the permeate flow path with a biocidal cleaning solution, to remove debris and to sanitize the narrow, axial, permeate channel. Thus the construction permits a cleaning solution to pass through the one to the other ends of the permeate flow channel 72, without the need to pass the cleaning solution through the membrane.

A further and important advantage of the module as described is that the module may be operated with permeate back pressure, which reduces the effective, but not actual, inlet pressure and reduces membrane compaction at the inlet end of the reverse-osmosis system. The permeate back pressure may, for example, be as high as the blowout pressure, but typically may vary from about 100 to 800 psi. Permeate back pressure can be accomplished by the use of a back-pressure regulator, such as a spring-loaded back-pressure valve. The ability to use permeate back pressure permits the use of additional reverse-osmosis modules in the system and avoids the transmembrane pressure limitations associated with other systems.

Cleaning of the modules is accomplished by flushing the feed and permeate sides of the membrane 50 with a cleaning or sanitizing solution. Cleaning is usually done periodically or when the flux rate of the membrane drops below or approaches a predetermined minimum flux rate for the system. Cleaning is particularly important for dairy- and food-application use. The module permits a cleaning solution to be introduced, both on the permeate and the feed sides of the membrane. The permeate side of the membrane 50 is cleaned by introducing a cleaning solution into the manifold passageway 24, through the passageways 46 and 48, to the collector ring cavity 64 and then through the parallel grooves of the tricot material 54 about the membrane 50, and removing the cleaning solution at the other end through the corresponding passageway. The cleaning operation flows through the open-mesh material 54 and the porous carrier material 52, to clean the back or permeate side of the membrane 50.

The module also includes a pair of post members 34 extending from the tube sheets 16 and 18, and the posts threaded at their outer ends. A unitary, metal, curved, backing member 32 is fitted over the post members 34 and secured in place by threaded retainers 36 on the post members. The backing shown has cut-out forked sections 38 and 40 to accomodate the extension of the feed inlet 28 and feed outlet tubes 30 to the module. The backing member is a curved segment; for example, 60° to 180°, which fits about the outer wall surface of all the U-bend elements 26 at each end. The U bends are thus retained in an operational fluid-tight relationship upon tightening the retainers 36.

In operation, the inward movement of the U-bend elements 26, by the movement of the backing 32, pushes the expander section 62 inwardly in a slidable manner within the bushing 56. The retaining ring 60 forces the cup washer 58 inwardly to effect a fluid-tight, high-pressure seal of the T bushing 56, with the interior membrane wall and the external wall of the tube sheet 18. This arrangement and construction are most advantageous, since all U bends can be placed in a sealing relationship at the same time, without the need of individual bolting of individual U-bend flanges, and permit quick removal of the backing element and the U bends when desired. On release of the backing element 32, the expander section 62 of each end of the U bends slides out, while the cup washer 58 and bushing 56 are retained in place; thus, preventing disturbing the membrane elastomeric bushing seal. The curved backing element provides for uniform force to be applied to the curved U-bend elements.

The module of our invention thus provides significant and important advantages over prior-art modules in permitting rapid and simple removal and replacement of membranes, the easy cleaning of the permeate flow path, the use of permeate back pressure, and removal of permeate without the need for cabinets, and other advantages.

What we claim is:

1. In a membrane module for the separation of fluids by reverse osmosis or ultrafiltration, which module comprises:
    (a) a plurality of outer pressure-containing tubes having a one end and another end;
    (b) a plurality of membrane tubes containing a tubular membrane therein for the separation of fluids from a feed stream into a concentrate fraction and a permeate fraction, the membrane tubes having a one end and another end, the membrane tubes positioned within the outer tubes and spaced apart from the interior wall surface of the outer tubes, to define a thin, annular, axial, permeate-flow channel about the exterior wall of the membrane tubes;
    (c) tube-plate means at the one and the other ends of the module, to retain the one and the other ends of the outer tubes in a generally parallel, spaced-apart relationship, the plate means having an outer face and characterized by a plurality of tube passageways therein, to receive the one or the other ends of the membrane tubes, and characterized by a permeate-collection passageway therein having a permeate outlet, whereby permeate from each of the thin, annular, permeate-flow channels may be collected in the permeate-collection passageway and discharged from the permeate outlet;
    (d) connecting means to provide for fluid-flow communication between the membrane tubes at each end thereof, so as to permit serial flow between the membrane tubes of the module;

(e) a feed inlet to provide for the introduction of a feed stream into the interior of the one or the other end of one of the membrane tubes; and (f) a feed outlet to provide for the withdrawal from the one or the other end of one of the membrane tubes of a concentrate fraction from the interior of the membrane tube, after serial-flow passage of the feed stream through the plurality of membrane tubes in the module, the improvement which comprises (i) a radial, permeate-collector cavity in the tube passageway of the plate means and at and surrounding the one and the other ends of the membrane tubes in the tube passageway, (ii) an open-mesh-material means disposed in the annular, permeate channel and peripherally about the exterior surface of the membrane tubes, the open-mesh material extending into the tube passageway at the one and the other ends, to permit axial flow of the permeate toward the one or the other ends of the membrane tubes and into the radial, permeate-collector cavity at each end, (iii) a radial, permeate, channel passageway, the passageway extending radially outwardly from each collector cavity about the one or the other end of the membrane tubes to the permeate-collector passageway in the tube-plate means at the one or the other end, (iv) a grommet-sealing means extending into the interior of the membrane tubes at the one and the other ends thereof, (v) the connecting means having extending, skirt-element means at the one and the other ends thereof, the skirt elements extending within the grommet-sealing means and into a close, sealing relationship therewith, and forcing the sealing grommet radially outwardly and into a close, sealing relationship with and against the interior of the membrane tube in the tube passageway, but with a force insufficient to compact the open-mesh material peripherally surrounding the membrane tube in the tube passageway and to prevent the flow of permeate to the permeate-collector cavity, and (vi) means to retain the connecting means inwardly toward and into a sealing relationship with the outer face of each of the plate means, whereby permeate, which passes through the membrane tube, is collected in the annular permeate-flow channel about the tube, flows axially toward one or the other end, or both ends, of the respective tubes, is collected in the radial, permeate-collector cavity at the end of the membrane tube, and flows from the collector cavity through the radial, permeate passageway into the permeate-collection passageway of the tube-plate means.

2. The module of claim 1 wherein the open-mesh material comprises a woven textile material of synthetic fibers, with the weave of the material about the membrane tube promoting axial flow of the permeate in the permeate-flow channel.

3. The module of claim 2 wherein the open-mesh material comprises a single layer of a woven, tricot, textile material, the textile material containing a plurality of generally parallel, grooved, woven passageways substantially axially disposed in the permeate-flow channel.

4. The module of claim 3 wherein the open-mesh material comprises a single-layer wrap of a fibrous, resin-impregnated, textile material having sufficient rigidity and stiffness, to prevent the substantial compaction of the material in the permeate-flow channel in the tube passageway, by the outward force of the skirt element and the grommet-sealing means.

5. The module of claim 1 wherein the tube-plate means includes a plurality of straight, permeate-collection passageways in each tube plate, the collection passageways extending generally perpendicular to the axis of the membrane tubes and disposed, so that the tube passageways extend on either side of the generally vertical, permeate-collection passageways throughout the length of the tube-plate means.

6. The module of claim 1 wherein the grommet-sealing means comprises an elastomeric, generally T-shaped bushing, and the module includes retaining means about the end of each of the skirt-element means, the T-shaped head of the bushing forced by the retaining means against the outer face of the tube-plate means, to form a sealing relationship therewith.

7. The module of claim 6 wherein the grommet-sealing means comprises an elastomeric, generally T-shaped bushing, and which module includes a cup-like washer means and a retaining-ring means on the one and the other ends of the skirt elements, the retaining-ring means retaining the washer means against the head of the T-shaped bushing and in a sealing relationship against the outer face of the tube-plate means, when the connecting element is forced inwardly toward the outer face by the retaining means.

8. The module of claim 1 wherein the connecting means includes a plurality of U-bend elements, and the means to retain the connecting means includes a unitary-backing means extending generally the length of the tube-plate means, the unitary-backing means engaging all of the U-bend elements in a retaining relationship at the same time.

9. The module of claim 1 wherein the connecting means includes a plurality of individual U-bend elements, and wherein the means to retain the individual U-bend elements includes a generally curved, unitary-backing means, and means to force the backing means inwardly and towards the outer face of the tube-plate means.

10. The module of claim 1 which includes an annular insert means positioned within the annular, permeate-collector cavity, to reduce the volume of the collector cavity, without substantial restriction on the permeate flow within the cavity.

11. The module of claim 10 wherein the insert means comprises a plastic ring element having a serrated, lower edge, the plastic ring occupying a substantial portion of the collector cavity.

12. A membrane module which comprises a plurality of the modules of claim 1, the modules placed in a serial-fluid-flow communication with each other, to permit the separation of a feed stream introduced into one module into a concentrate fraction and a permeate stream removed from another module.

13. The module of claim 1 wherein the open-mesh-material means extends along the entire length of the membrane tubes and across one side of the annular, permeate-flow cavity.

14. The module of claim 1 wherein the annular, permeate-flow channel has a thickness of from about 5 to 50 mils, and the permeate-flow channel is substantially occupied by the open-mesh-material means.

15. The module of claim 1 wherein the open-mesh material comprises a woven tricot material having a one side with generally parallel grooves therein, and another, generally flat side, the grooved side of the material disposed against the interior surface of the outer tubes.

16. In a membrane module for the separation of fluids by reverse osmosis or ultrafiltration, which module comprises:
   (a) a plurality of outer pressure-containing tubes having a one end and another end;
   (b) a plurality of membrane tubes containing a tubular membrane therein for the separation of fluids from a feed stream into a concentrate fraction and a permeate fraction, the membrane tubes having a one end and another end, the membrane tubes positioned within the outer tubes and spaced apart from the interior wall surface of the outer tubes, to define a thin, annular, axial, permeate-flow channel about the exterior wall of the membrane tubes;
   (c) tube-plate means at the one and the other ends of the module, to retain the one and the other ends of the outer tubes in a generally parallel, spaced-apart relationship, the plate means having an outer face and characterized by a plurality of tube passageways therein, to receive the one or the other ends of the membrane tubes, and characterized by a permeate-collection passageway therein having a permeate outlet, whereby permeate from each of the thin, annular, permeate-flow channels may be collected in the permeate-collection passageway and discharged from the permeate outlet;
   (d) generally U-shaped connecting means, to provide for fluid-flow communication between the membrane tubes at each end thereof, so as to permit serial flow between the membrane tubes of the module;
   (e) a feed inlet to provide for the introduction of a feed stream into the interior of the one or the other end of one of the membrane tubes; and
   (f) a feed outlet to provide for the withdrawal from the one or the other end of one of the membrane tubes of a concentrate fraction from the interior of the membrane tube, after serial-flow passage of the feed stream through the plurality of membrane tubes in the module, the improvement which comprises
      (i) a radial, permeate-collector cavity in the tube passageway of the plate means and at and surrounding the one and the other ends of the membrane tubes in the tube passageway,
      (ii) an open-mesh-material means, comprising a woven textile material of synthetic fibers, disposed in the annular, permeate channel and peripherally about the exterior surface of the membrane tubes, the open-mesh material extending into the tube passageway at the one and the other ends, to permit axial flow of the permeate toward the one or the other ends of the membrane tubes and into the radial, permeate-collector cavity at each end,
      (iii) a radial, permeate, channel passageway, the passageway extending directly radially outwardly from each collector cavity about the one or the other end of the membrane tubes to the permeate-collector passageway in the tube-plate means at the one or the other end,
      (iv) a resilient, generally T-shaped, grommet-sealing means extending into the interior of the membrane tubes at the one and the other ends thereof, the T-shaped head retained in a sealing relationship against the outer face of the tube-plate means,
      (v) the connecting means composed of a plurality of individual U-bend elements having extending skirt elements at the one and the other ends thereof, the skirt elements extending within the grommet-sealing means and into a close, sealing relationship therewith, and forcing the sealing grommet radially outwardly and into a close, sealing relationship with and against the interior of the membrane tubes in the tube passageway, but with a force insufficient to compact the open-mesh material peripherally surrounding the membrane tube in the tube passageway;
      (vi) backing means to force all of the U-bend elements, at the one or the other end of the tube-plate means, inwardly toward the outer face of each of the plate means and the T-shaped head of the grommet sealing against the outer face of the tube-plate means and into a sealing relationship, whereby permeate, which passes through the membrane tube, is collected in the annular, permeate-flow channel about the tube, flows axially toward one or the other end, or both ends, of the respective tubes, is collected in the radial, permeate-collector cavity at the end of the membrane tube, and flows from the permeate cavity through the radial, permeate passageway into the permeate-collection passageway of the tube-plate means.

17. The module of claim 16 which includes an annular insert means positioned in the annular, permeate-collector cavity, to reduce the volume of the collector cavity, without substantial restriction on the permeate flow within the cavity.

18. A membrane module which comprises a plurality of the modules of claim 16, the modules placed in a serial-fluid-flow communication with each other, to permit the separation of a feed stream introduced into one module into a concentrate fraction and a permeate stream removed from another module.

* * * * *